(12) United States Patent
Sakai et al.

(10) Patent No.: US 8,030,817 B2
(45) Date of Patent: Oct. 4, 2011

(54) ROTOR OF PERMANENT-MAGNET-TYPE ROTATING ELECTRICAL MACHINE

(75) Inventors: Kazuto Sakai, Yokosuka (JP); Masanori Arata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

(21) Appl. No.: 12/377,176

(22) PCT Filed: Aug. 2, 2007

(86) PCT No.: PCT/JP2007/065147
§ 371 (c)(1),
(2), (4) Date: Feb. 11, 2009

(87) PCT Pub. No.: WO2008/018354
PCT Pub. Date: Feb. 14, 2008

(65) Prior Publication Data
US 2010/0171385 A1    Jul. 8, 2010

(30) Foreign Application Priority Data
Aug. 11, 2006 (JP) ................................ 2006-220557

(51) Int. Cl.
*H02K 21/12* (2006.01)
(52) U.S. Cl. ............................... 310/156.53; 310/156.43
(58) Field of Classification Search .............. 310/156.43, 310/156.53–61, 156.84
See application file for complete search history.

(56) References Cited

U.S. PATENT DOCUMENTS

| | | | | |
|---|---|---|---|---|
| 2,939,025 A | * | 5/1960 | Williford, Jr. ......... | 310/216.107 |
| 4,127,786 A | * | 11/1978 | Volkrodt ................ | 310/156.84 |
| 6,025,667 A | * | 2/2000 | Narita et al. ............ | 310/156.53 |
| 6,177,745 B1 | * | 1/2001 | Narita et al. ............ | 310/156.43 |
| 6,229,239 B1 | * | 5/2001 | Lucidarme et al. ........... | 310/162 |
| 6,329,734 B1 | * | 12/2001 | Takahashi et al. ....... | 310/156.56 |
| 6,800,977 B1 | | 10/2004 | Ostovic | |
| 6,906,444 B2 | * | 6/2005 | Hattori et al. ........... | 310/156.53 |
| 7,598,645 B2 | * | 10/2009 | Ley et al. ................ | 310/156.38 |

(Continued)

FOREIGN PATENT DOCUMENTS

CN    1411126 A    4/2003

(Continued)

OTHER PUBLICATIONS

Yoji, T. et al., "Design and Control of Interior Permanent Magnet Synchronous Motor", Ohmsha Co., Ltd, (2001) (with English translation).

(Continued)

*Primary Examiner* — Thanh Lam
(74) *Attorney, Agent, or Firm* — Oblon, Spivak, McClelland, Maier & Neustadt, L.L.P.

(57) ABSTRACT

A rotor of a permanent-magnet-type rotating electrical machine of the present invention has a plurality of magnetic poles in point symmetry with respect to a rotation center of a rotor core 2. For each of the magnetic poles, there are arranged a permanent magnet 3 whose product of a coercive force and a magnetizing direction thickness is small and a permanent magnet 4 whose product of a coercive force and a magnetizing direction thickness is large. The permanent magnet 3 whose product of a coercive force and a magnetizing direction thickness is small is irreversibly magnetized by a magnetic field created by a current of an armature coil 21, to change a total linkage flux amount. This realizes a wide-range variable-speed operation of high output, to provide the rotating electrical machine with a wide operating range and high efficiency.

23 Claims, 9 Drawing Sheets

U.S. PATENT DOCUMENTS

| | | | |
|---|---|---|---|
| 2003/0011265 A1 * | 1/2003 | Hattori et al. | 310/156.38 |
| 2004/0189426 A1 | 9/2004 | Hidaka et al. | |
| 2007/0096578 A1 * | 5/2007 | Jahns et al. | 310/156.53 |
| 2007/0252468 A1 * | 11/2007 | Lee | 310/156.53 |
| 2008/0278021 A1 * | 11/2008 | Ley et al. | 310/156.38 |

FOREIGN PATENT DOCUMENTS

| | | |
|---|---|---|
| CN | 1617422 A | 5/2005 |
| CN | 1617423 A | 5/2005 |
| JP | 7 336919 | 12/1995 |
| JP | 7 336980 | 12/1995 |
| JP | 11 27913 | 1/1999 |
| JP | 11 136912 | 5/1999 |
| JP | 2006 100847 | 4/2006 |
| JP | 2006 280195 | 10/2006 |

OTHER PUBLICATIONS

Office Action issued Sep. 10, 2010 in Chinese Application No. 200780029854.0 (With English Abstract).

Office Action issued Mar. 17, 2011 in Chinese Application No. 200780029854.0 (with English Translation).

* cited by examiner

ROTOR OF PERMANENT-MAGNET-TYPE ROTATING ELECTRICAL MACHINE

TECHNICAL FIELD

The present invention relates to a rotor of a permanent-magnet-type rotating electrical machine.

BACKGROUND TECHNOLOGY

Generally, permanent-magnet-type rotating electrical machines are classified into two types. One is a surface-permanent-magnet-type rotating electrical machine having permanent magnets adhered to an outer circumferential face of a rotor core and an internal-permanent-magnet-type rotating electrical machine having permanent magnets embedded in a rotor core. For a variable-speed drive motor, the latter internal-permanent-magnet-type rotating electrical machine is appropriate.

The latter internal-permanent-magnet-type rotating electrical machine is described in "Design and Control of Internal Magnet Synchronous Motor," Takeda Yoji, et al., a document of Ohm-sha Publishing (Non-patent Document 1) and Japanese Unexamined Patent Application Publication No. H07-336919 (Patent Document 1). With reference to FIG. 9, a configuration of such a conventional internal-permanent-magnet motor will be explained. Inside a rotor core 2 of a rotor 1 and close to an outer circumference thereof, rectangular hollows are arranged in a point symmetry of 360°/N where N is the number of poles. The number of the rectangular hollows is equal to the number N of poles. In FIG. 9, the rotor 1 has four poles, and therefore, four hollows are arranged in a point symmetry of 90° (=360°/4) and permanent magnets 4 are inserted into the hollows, respectively. Each permanent magnet 4 is magnetized in a radial direction of the rotor 1, i.e., in a direction orthogonal to a side (long side in FIG. 9) of the rectangular section of the permanent magnet 4 that faces an air gap. The permanent magnet 4 is usually an NdFeB permanent magnet having a high coercive force so that it is not demagnetized with a load current. The rotor core 2 is formed by laminating electromagnetic sheets through which the hollows are punched. The rotor 1 is incorporated in a stator 20. The stator 20 has an armature coil 21 that is installed in a slot formed on an inner side of a stator iron core 22. An inner circumferential face of the stator 20 and an outer circumferential face of the rotor 1 face each other with the air gap 23 interposing between them.

An example of a high-output rotating electrical machine having an excellent variable-speed characteristic is a permanent-magnet-type reluctance rotating electrical machine described in Japanese Unexamined Patent Application Publication No. H11-27913 (Patent Document 2) and Japanese Unexamined Patent Application Publication No. H11-136912 (Patent Document 3). This kind of permanent-magnet-type rotating electrical machine has a structural characteristic that a permanent magnet thereof always generates constant linkage flux to increase a voltage induced by the permanent magnet in proportion to a rotation speed. Accordingly, when a variable-speed operation is carried out from low speed to high speed, the voltage (counter electromotive voltage) induced by the permanent magnet becomes very high at high rotation speed. The voltage induced by the permanent magnet is applied to electronic parts of an inverter, and if the applied voltage exceeds a withstand voltage of the electronic parts, the parts will cause insulation breakage. It is necessary, therefore, to design the machine so that a flux amount of the permanent magnet is reduced below the withstand voltage. Such a design, however, lowers the output and efficiency of the permanent-magnet-type rotating electrical machine in a low-speed zone.

If the variable-speed operation is carried out in such a way as to provide nearly a constant output from low speed to high speed, the voltage of the rotating electrical machine will reach an upper limit of a power source voltage in a high rotation speed zone. This is because the linkage flux of the permanent magnet is constant. In the high rotation speed zone, therefore, a current necessary for providing the constant output will not pass. This greatly drops the output in the high rotation speed zone and the variable-speed operation will not be carried out in a wide range up to high rotation speed.

Recent techniques of expanding a variable-speed range employ flux-weakening control such as one described in the Non-patent Document 1. In the case of the permanent-magnet-type rotating electrical machine, a total linkage flux amount is the sum of flux by a d-axis current and flux by a permanent magnet. The flux-weakening control is based on this and generates flux with a negative d-axis current to reduce the total linkage flux amount of an armature coil. The flux-weakening control makes the permanent magnet 4 of high coercive force operate in a reversible range on a magnetic characteristic curve (B-H characteristic curve). For this, the permanent magnet is an NdFeB magnet having a high coercive force so that it may not irreversibly demagnetized with a demagnetizing field produced by the flux-weakening control.

In the flux-weakening control, flux produced by a negative d-axis current reduces linkage flux and a reduced portion of the linkage flux produces a voltage margin for an upper voltage limit. This makes it possible to increase a current for a torque component, thereby increasing an output in a high-speed zone. In addition, the voltage margin makes it possible to increase a rotation speed, thereby expanding a variable-speed operating range.

In the flux-weakening control, however, since a negative d-axis current that contributes nothing to an output is continuously passed, an iron loss increases to deteriorate efficiency. In addition, a demagnetizing field produced by the negative d-axis current generates harmonic flux that causes a voltage increase. Such a voltage increase limits a voltage reduction achieved by the flux-weakening control. These factors make it difficult for the flux-weakening control to conduct a variable-speed operation for the internal-permanent-magnet-type rotating electrical machine at speeds over three times a base speed. In addition, the harmonic flux increases an iron loss to drastically reduce efficiency in middle- and high-speed zones. Further, the harmonic flux generates an electromagnetic force that produces vibration.

When the internal-permanent-magnet motor is employed for a drive motor of a hybrid car, the motor rotates together with an engine when only the engine is used to drive the hybrid car. In this case, a voltage induced by the permanent magnets of the motor increases at middle or high rotation speed. To suppress an increase in the induced voltage below a power source voltage, the flux-weakening control continuously passes a negative d-axis current. The motor in this state, therefore, produces only a loss to deteriorate an overall operating efficiency.

When the internal-permanent-magnet motor is employed for a drive motor of an electric train, the electric train sometimes carries out a coasting operation. Then, like the above-mentioned example, the flux-weakening control is carried out to continuously pass a negative d-axis current to suppress a voltage induced by the permanent magnets below a power source voltage. The motor in this state only produces a loss to deteriorate an overall operating efficiency.

Patent Document 1: Japanese Unexamined Patent Application Publication No. H07-336919

Patent Document 2: Japanese Unexamined Patent Application Publication No. H11-27913

Patent Document 3: Japanese Unexamined Patent Application Publication No. H11-136912

Non-patent Document 1: "Design and Control of Internal Magnet Synchronous Motor," Takeda Yoji, et al., Ohm-sha Publishing

DISCLOSURE OF INVENTION

The present invention has been made to solve the above-mentioned problems of the related arts and an object of the present invention is to provide a rotor that is suitable for constituting a permanent-magnet-type rotating electrical machine that is capable of conducting a variable-speed operation in a wide range from low speed to high speed, realizing high torque in a low rotation speed zone and high output in middle and high rotation speed zones, improving efficiency, reliability, and productivity, and reducing materials, in particular, rare materials.

An aspect of the present invention provides a rotor of a permanent-magnet-type rotating electrical machine, characterized in that a plurality of magnetic poles are arranged in point symmetry with respect to a rotation center of a rotor core, plural kinds of permanent magnets having different shapes or material characteristics are used to form each of the magnetic poles, and at each of the magnetic poles, at least one kind of permanent magnet of the plural kinds of permanent magnets having different shapes or material characteristics is magnetized by a magnetic field created by a current of an armature coil, to irreversibly change a flux amount of the permanent magnet.

Among the permanent magnets of plural kinds in the above-mentioned rotor of a permanent-magnet-type rotating electrical machine, the permanent magnet that is magnetized by the magnetic field created by the current of the armature coil, to irreversibly change the flux amount thereof nearly zeroes a linkage flux amount of the armature coil created by all permanent magnets that form the magnetic pole concerned.

Another aspect of the present invention provides a rotor of a permanent-magnet-type rotating electrical machine, characterized in that a plurality of magnetic poles are arranged in point symmetry with respect to a rotation center of a rotor core, plural kinds of permanent magnets having different shapes or material characteristics are used to form each of the magnetic poles, and at each of the magnetic poles, at least one kind of permanent magnet of the plural kinds of permanent magnets having different shapes or material characteristics is magnetized by a magnetic field created by a current of an armature coil, to reverse the polarity of the permanent magnet.

The rotor of a permanent-magnet-type rotating electrical machine of the present invention can realize, when assembled in a stator, a variable-speed operation in a wide range from low speed to high speed. The permanent-magnet-type rotating electrical machine, therefore, realizes high torque in a low rotation speed zone and high output in middle and high rotation speed zones, improves efficiency, reliability, and productivity, and reduces materials, in particular, rare materials.

BEST MODE OF IMPLEMENTING INVENTION

The embodiments of the present invention will be explained in detail with reference to the drawings. Although each of the below-mentioned embodiments exemplarily shows a permanent-magnet-type rotating electrical machine with permanent magnets for four poles embedded in a rotor, the present invention is applicable to any other number of poles.

First Embodiment

Figure 1:
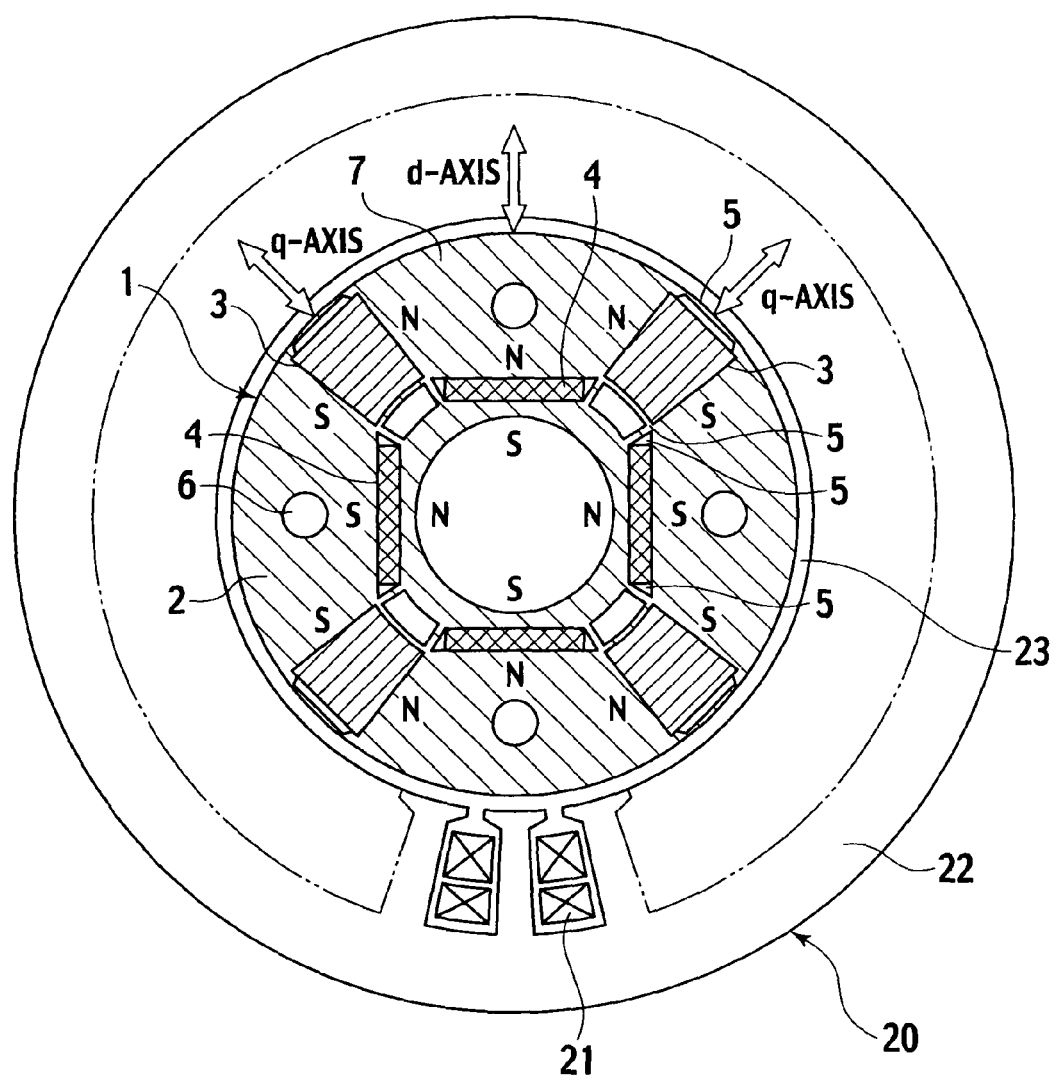
FIG. 1 is a sectional view showing a permanent-magnet-type rotating electrical machine according to a first embodiment of the present invention.

A permanent-magnet-type rotating electrical machine according to the first embodiment of the present invention will be explained with reference to FIGS. 1 to 5. FIG. 1 shows a structure of the permanent-magnet-type rotating electrical machine according to the embodiment. Inside a stator 20, a rotor 1 is accommodated to face the stator 20 with an air gap 23 interposing between them. The stator 20 may be of a standard structure adoptable for an AC motor. According to this embodiment, the stator 20 is similar to the conventional stator 20 shown in FIG. 9.

The rotor 1 according to the embodiment includes a rotor core 2, first permanent magnets 3 whose product of a coercive force and a magnetizing direction thickness is small, and second permanent magnets 4 whose product of a coercive force and a magnetizing direction thickness is large. The rotor core 2 is constituted by laminating silicon steel plates. The first and second permanent magnets 3 and 4 are embedded in the rotor core 2. The first permanent magnet 3 whose product of a coercive force and a magnetizing direction thickness is small is an alnico magnet and four magnets 3 are embedded in diametrical sections of the rotor core 2. The first permanent magnet 3 may be an FeCrCo magnet. The second permanent magnet 4 whose product of a coercive force and a magnetizing direction thickness is large is an NdFeB magnet and four magnets 4 are embedded in diametrical sections of the rotor core 2.

The first permanent magnet 3 is arranged substantially along the diameter of the rotor 1. A cross section of the first permanent magnet 3 is trapezoidal. A magnetizing direction of the first permanent magnet 3 is substantially a circumferential direction of the rotor 1. Each of the first permanent magnets 3 is arranged between magnetic poles, and therefore, the magnetizing direction thickness of the first permanent magnet 3 per pole is ½ of an actual size. According to the embodiment, the actual size of the first permanent magnet 3 is 6 mm, and therefore, the magnetizing direction thickness thereof per pole is 3 mm. The second permanent magnets 4 are arranged substantially in a circumferential direction of the rotor 1 and each has a rectangular cross-sectional shape. A magnetizing direction of the second permanent magnet 4 is substantially a diametrical direction of the rotor 1 and the magnetizing direction thickness thereof is 2 mm.

Magnetization of the permanent magnets according to the embodiment will be explained. In connection with the second permanent magnets 4 on a d-axis magnetic circuit, flux by a d-axis current passes between two second permanent magnets 4 (two adjacent second permanent magnets 4 having different poles), and therefore, a magnetic field by the d-axis current acts on one second permanent magnet 4 per pole. In connection with the first permanent magnets 3, the flux by the d-axis current passes through one first permanent magnet 3 between magnetic poles, and therefore, the magnetic field by the d-axis current acts on ½ of the second permanent magnet 4 per pole. When evaluating characteristics on a magnetic circuit for one pole, the magnetizing direction thickness of the first permanent magnet 3 is considered as ½ of the actual size thereof.

Figure 2:
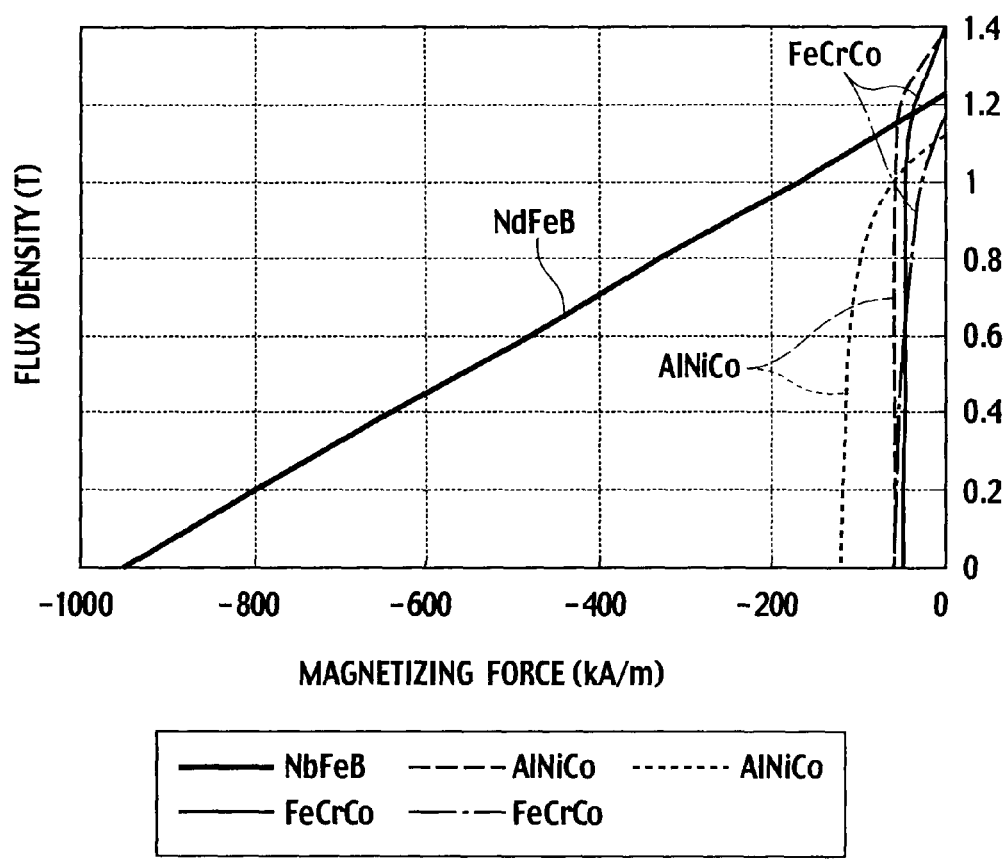
FIG. 2 is a graph showing magnetic characteristics of a first permanent magnet of low coercive force and a second permanent magnet of high coercive force adopted by the above-mentioned embodiment.

FIG. 2 shows the magnetic characteristics of an alnico (AlNiCo) magnet used for the first permanent magnet 3, an FeCrCo magnet, and an NdFeB magnet used for the second permanent magnet 4. The coercive force (a magnetic field where a flux density becomes zero) of the alnico magnet is 60 to 120 kA/m and is $1/15$ to $1/8$ of a coercive force of 950 kA/m of the NdFeB magnet. The coercive force of the FeCrCo magnet is about 60 kA/m which is $1/15$ of the coercive force of 950 kA/m of the NdFeB magnet. It is understood that the alnico magnet and FeCrCo magnet each have a coercive force fairly lower than the NdFeB magnet.

According to the embodiment, the first permanent magnet 3 whose product of a coercive force and a magnetizing direction thickness is small is an alnico magnet having a coercive force of 120 kA/m. The alnico magnet used as the first permanent magnet 3 of the embodiment has the product of a coercive force and a magnetizing direction thickness of 120 kA/m×3×10$^{-3}$=360 A. The second permanent magnet 4 whose product of a coercive force and a magnetizing direction thickness is large is an NdFeB magnet having a coercive force of 1000 kA/m. The NdFeB magnet used as the second permanent magnet 4 of the embodiment has the product of a coercive force and a magnetizing direction thickness of 1000 kA/m×2×10$^{-3=2000}$ A. Namely, according to the embodiment, the product of a coercive force and a magnetizing direction thickness of the second permanent magnet 4 is 5.6 times as large as that of the first permanent magnet 3.

As shown in FIG. 1, each first permanent magnet 3 is embedded in the rotor core 2. Each end of the first permanent magnet 3 is provided with a hollow 5. To sufficiently resist against a centrifugal force at high-speed rotation, the center of a pole core portion 7 of the rotor core 2 is provided with a bolt hole 6. This is used to fasten the rotor core 2 with a bolt to a rotor end plate and a shaft.

The first permanent magnet 3 is arranged in a radial direction of the rotor 1 along a q-axis serving as a center axis of an inter-pole part. An axis of easy magnetization of the first permanent magnet 3 made of an alnico magnet is substantially a circumferential direction of the rotor 1, i.e., a direction orthogonal to the radius of the rotor 1 (in FIG. 1, a direction orthogonal to a line that halves the trapezoidal section of the first permanent magnet 3 and passes through the rotation center).

The second permanent magnet 4 made of an NdFeB magnet of high coercive force is also embedded in the rotor core 2 and each end thereof is provided with a hollow 5. The second permanent magnets 4 are substantially arranged in a circumferential direction of the rotor 1 such that each second permanent magnet 4 is arranged between two first permanent magnets 3 on the inner circumferential side of the rotor 1. An axis of easy magnetization of the second permanent magnet 4 is substantially orthogonal to the circumferential direction of the rotor 1 (in FIG. 1, a direction orthogonal to a long side of the rectangular section of the second permanent magnet 4).

Each pole core portion 7 of the rotor core 2 is surrounded by two adjacent first permanent magnets 3 and one second permanent magnet 4. As shown in FIGS. 1 and 3 to 5, a center axis of the pole core portion 7 of the rotor core 2 is on the d-axis and a center axis of a part between the adjacent pole core portions 7 is on the q-axis. Accordingly, the first permanent magnet 3 is arranged along the q-axis, i.e., the center axis of the part between the adjacent pole core portions 7 and is magnetized in a direction that forms 90° or −90° with respect to the q-axis. Concerning the adjacent first permanent magnets 3, polar faces that face each other are of the N or S pole. The second permanent magnet 4 is arranged in a direction orthogonal to the d-axis, i.e., orthogonal to the center axis of the pole core portion 7 and is magnetized in a direction that forms 0° or 180° with respect to the d-axis. The adjacent second permanent magnets 4 are oppositely polarized.

Operation of the permanent-magnet-type rotating electrical machine according to the embodiment having the above-mentioned configuration will be explained. A magnetomotive force necessary for magnetization is approximated by the product of a magnetic field necessary for magnetization and the thickness of a permanent magnet. The alnico magnet is magnetized nearly 100% with a magnetic field of 250 kA/m. The product of the magnetizing field and the thickness of the magnet is expressed as 250 kA/m×3×10$^{-3}$=750 A. The NdFeB magnet is magnetized nearly 100% with a magnetic field of 1500 kA/m. The product of the magnetizing field and the thickness of the magnet is expressed as 1500 kA/m×2×10$^{-3}$=3000 A. Accordingly, the first permanent magnet 3 made of the alnico magnet is magnetized with a magnetic field of about ¼ of that for the second permanent magnet 4 made of the NdFeB magnet.

According to the embodiment, an armature coil 21 of the stator 20 passes a pulse current for a very short time (about 0.1 ms to 10 ms), to form a magnetic field that acts on the first permanent magnets 3. The pulse current that forms a magnetizing field for the permanent magnets is a d-axis current component of the armature coil 21 of the stator 20. If the magnetizing field is of 250 kA/m, the magnetizing field is theoretically sufficient to magnetize the first permanent magnets 3 and causes no irreversible demagnetization on the second permanent magnets 4.

Figure 3:
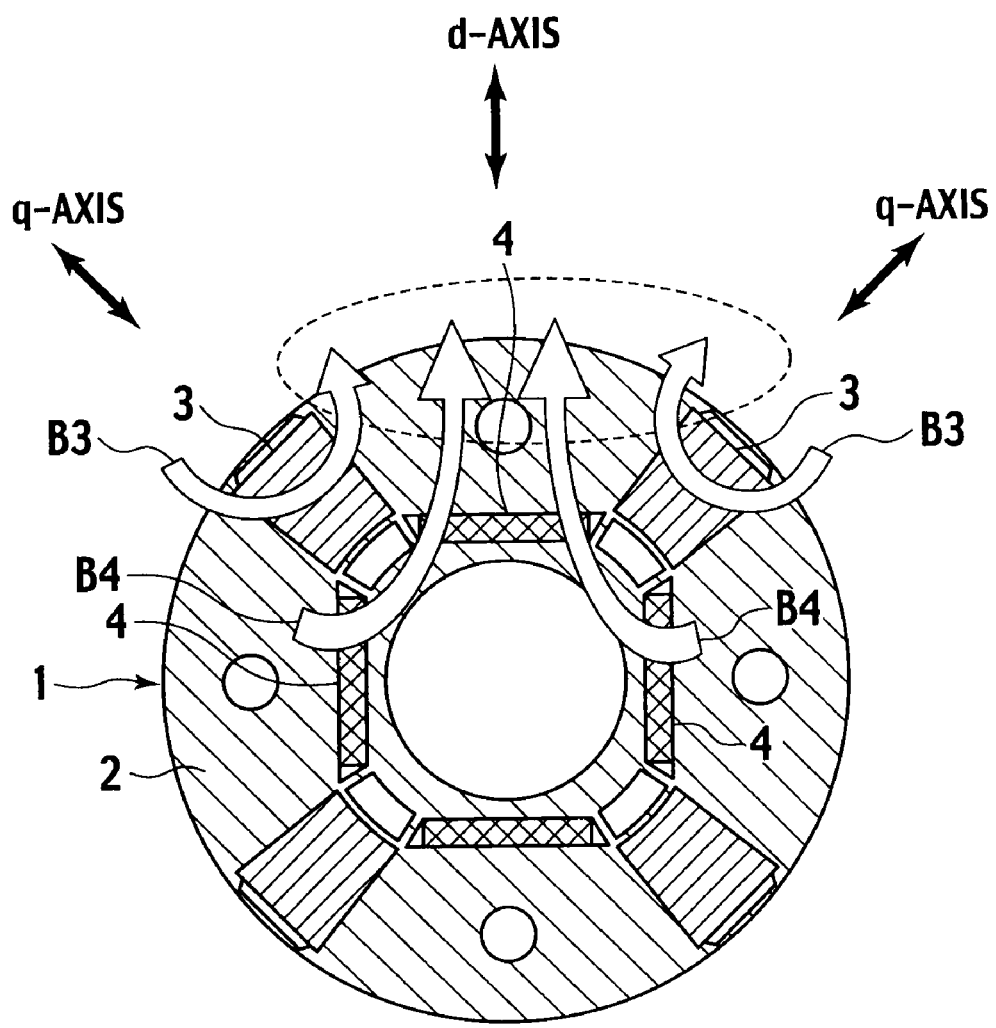
FIG. 3 is a sectional view showing flux (maximum linkage flux) of the permanent magnets in the rotor according to the above-mentioned embodiment, the permanent magnets being irreversibly magnetized with a d-axis current.

FIG. 3 shows fluxes B3 and B4 of the permanent magnets 3 and 4 when a magnetizing field acts such that the fluxes of the first and second permanent magnets 3 and 4 are additive at the magnetic poles and air gap faces. In FIG. 3, linkage flux by the first and second permanent magnets 3 and 4 increases to establish a magnetizing state. The magnetizing field is formed by passing a pulse current for a very short time through the armature coil 21 of the stator 20. The current passed at this time is a d-axis current component. The pulse current quickly becomes zero to eliminate the magnetizing field. However, the first permanent magnets 3 irreversibly change to generate flux in the magnetizing direction. Flux distributions shown in FIGS. 3, 4, and 5 are those related to one magnetic pole.

Figure 4:
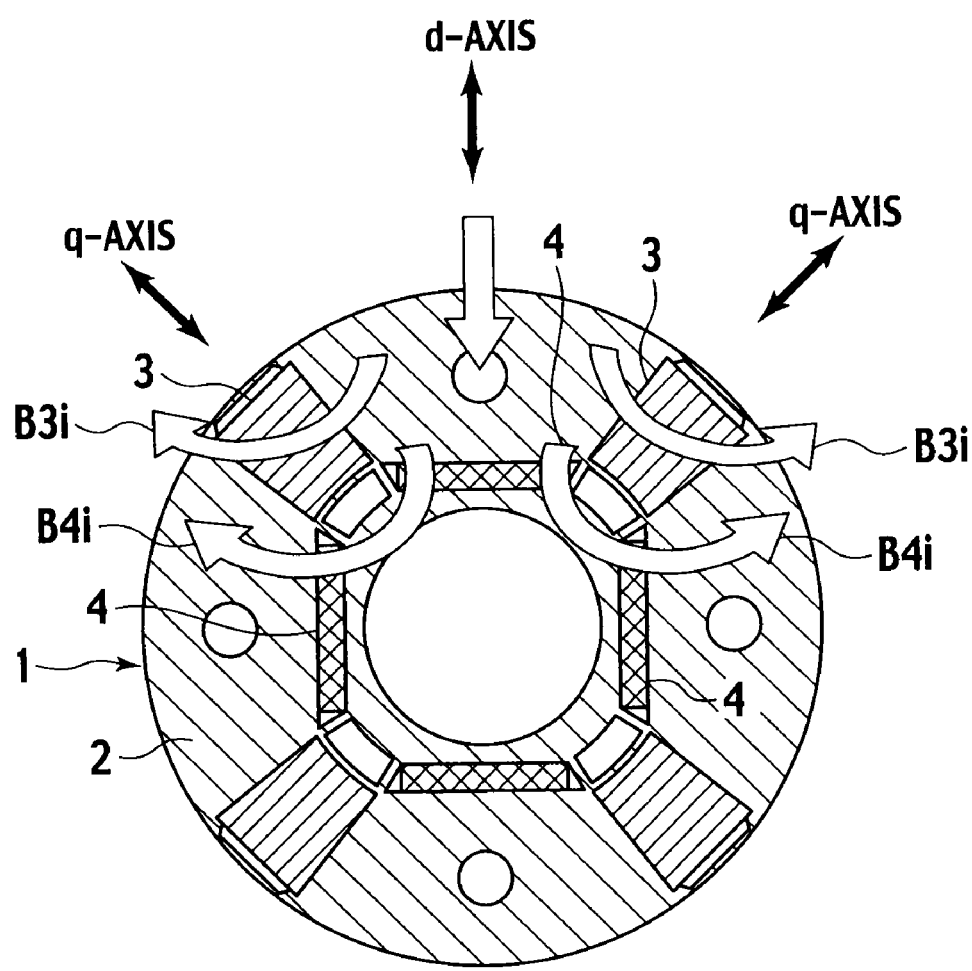
FIG. 4 is a sectional view showing flux of a demagnetizing field created by a negative d-axis current in the rotor according to the above-mentioned embodiment.
Figure 5:
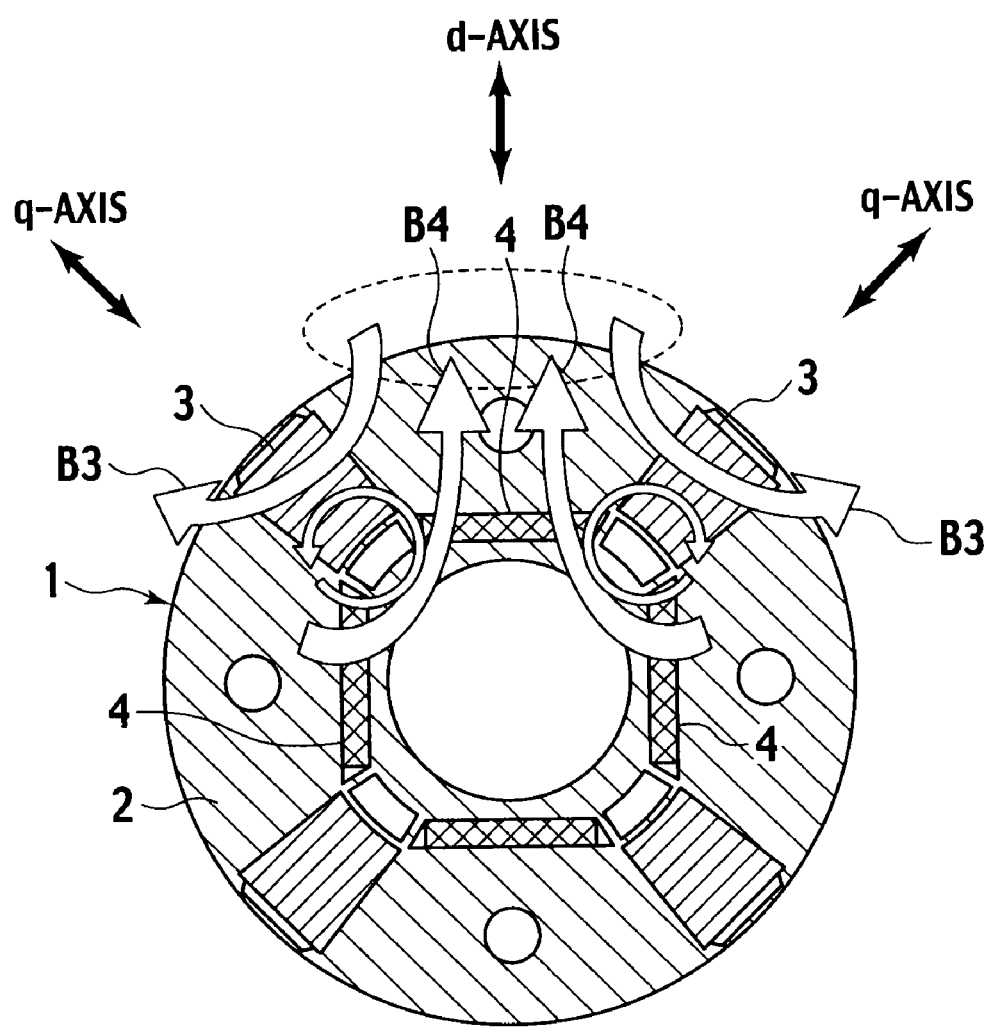
FIG. 5 is a sectional view showing flux (minimum linkage flux) of the permanent magnets as a result of the demagnetizing field created by the negative d-axis current in the rotor according to the above-mentioned embodiment.

FIG. 4 shows an action to decrease linkage flux. A negative d-axis current is passed through the armature coil 21 of the stator 20, to form a magnetic field that generates fluxes B3i and B4i in a direction opposite to the direction shown in FIG. 3. The magnetic field created by the negative d-axis current passed through the armature coil 21 of the stator 20 acts from the pole center of the rotor 1 toward the first and second permanent magnets 3 and 4 opposite to the magnetizing direction. Each of the permanent magnets 3 and 4 receives the magnetic field in a direction opposite to the magnetizing direction. Since the alnico magnet of the first permanent magnet 3 is small in the product of a coercive force and a magnetizing direction thickness, the flux of the first permanent magnet 3 irreversibly decreases due to the opposite magnetic field. On the other hand, the NdFeB magnet of the second permanent magnet 4 is large in the product of a coercive force and a magnetizing direction thickness, and therefore, the magnetic characteristic thereof is within a reversible range even when it receives the opposite magnetic field. Accordingly, the magnetized state of the second permanent magnet 4 is unchanged after the magnetizing field by the negative d-axis current disappears and the flux amount thereof is also unchanged. Consequently, only the first permanent magnets 3 are demagnetized to reduce a linkage flux amount.

The embodiment also passes a larger current to form a strong opposite magnetic field to reverse the polarity of the first permanent magnets 3. Reversing the polarity of the first permanent magnets 3 results in greatly reducing linkage flux, even zeroing the linkage flux.

As explained above, the product of a magnetizing field and a magnet thickness of the alnico magnet is about ¼ of that of the NdFeB magnet, and therefore, a magnetic field that is sufficient to magnetize only the alnico magnet of each first permanent magnet 3 is generated. FIG. 5 shows a magnetized state established with a negative d-axis current. The flux B4 of the second permanent magnets 4 is cancelled with the flux B3 of the first permanent magnets 3. If the flux amount of the magnets 3 is equal to that of the magnets 4, an air gap flux can nearly be zeroed. At this time, the flux of the second permanent magnets 4 is cancelled and forms a magnetic circuit with the first permanent magnets 3. Accordingly, the fluxes largely distribute within the rotor 1. This results in uniformly zeroing a distribution of air gap flux densities.

The rotating electrical machine of the related art may cancel the flux of the permanent magnets of the rotor 1 by generating flux with a negative d-axis current passed through the armature coil 21. This may reduce combined fundamental flux to about 50%. However, harmonic flux substantially increases to cause a harmonic voltage and harmonic iron loss. It is very difficult to zero linkage flux. Even if the fundamental flux is zeroed, harmonic flux conversely becomes large.

On the other hand, the permanent-magnet-type rotating electrical machine of the embodiment can uniformly reduce flux only with the permanent magnets 3 and 4, and therefore, produces little harmonic flux and causes no loss. In connection with magnetization of the permanent magnets, the permanent-magnet-type rotating electrical machine of the embodiment applies a magnetic field created by a d-axis current to two second permanent magnets 4 (N- and S-pole permanent magnets). At this point, the magnetic field acting on the second permanent magnet 4 is about a half of the magnetic field acting on the first permanent magnet 3.

According to the permanent-magnet-type rotating electrical machine of the embodiment, the first permanent magnet 3 whose product of a coercive force and a magnetizing direction thickness is small is easily magnetized with the magnetic field created by the d-axis current. The product of a magnetizing field and a magnet thickness of the second permanent magnet 4 is four times as large as that of the first permanent magnet 3. Structurally, a magnetic field created by a d-axis current and acting on the second permanent magnet 4 is ½ of that acting on the first permanent magnet 3. As a result, magnetizing the second permanent magnet 4 needs a magnetomotive force eight times as large as that for the first permanent magnet 3. Namely, with respect to a magnetic field sufficient to magnetize the first permanent magnet 3, the second permanent magnet 4 is in a reversible demagnetization state, and therefore, the second permanent magnet 4 can maintain a flux state before magnetization, even after magnetization.

A mutual magnetic influence between the first permanent magnet 3 made of the alnico magnet and the second permanent magnet 4 made of the NdFeB magnet will be explained. In the demagnetizing state of FIG. 5, the magnetic field B4 of the second permanent magnet 4 acts as a biasing magnetic field on the first permanent magnet 3. Namely, a magnetic field by a negative d-axis current and the magnetic field B4 by the second permanent magnet 4 act on the first permanent magnet 3, to easily magnetize the first permanent magnet 3. The product of a coercive force and a magnetizing direction thickness of the first permanent magnet 3 can be made equal to or larger than the product of a magnetic field strength and a magnetizing direction thickness of the second permanent magnet 4 at a no-load operating point. Then, in a linkage flux increased state, the magnetic field of the first permanent magnet 3 overcomes the magnetic field B4 of the second permanent magnet 4, to provide a flux amount.

As mentioned above, the permanent-magnet-type rotating electrical machine of the embodiment employs a d-axis current to widely change the linkage flux amount B3 of the first permanent magnet 3 from a maximum to zero and magnetize the magnet in both the normal and reverse directions. If the linkage flux B4 of the second permanent magnet 4 is in the normal direction, the linkage flux B3 of the first permanent magnet 3 is adjustable from a maximum to zero, and further, to a maximum in the reverse direction. As a result, the permanent-magnet-type rotating electrical machine of the embodiment can magnetize the first permanent magnet 3 with a d-axis current, to adjust the total linkage flux amount (B3+B4) of the first and second permanent magnets 3 and 4 in a wide range.

(1) In a low-speed zone, the first permanent magnet 3 is magnetized with a d-axis current so that the flux thereof takes the maximum value in the same direction as the linkage flux of the second permanent magnet 4 (the magnetizing state shown in FIG. 3). This maximizes torque produced by the first and second permanent magnets 3 and 4, and therefore, the torque and output of the rotating electrical machine are maximized.

(2) In middle- and high-speed zones, the flux amount B3 of the first permanent magnet 3 is decreased (the demagnetizing state of FIG. 5), to decrease the total linkage flux amount. This results in decreasing a voltage of the rotating electrical machine, to make a margin for the upper limit value of a power source voltage, thereby enabling a rotation speed (frequency) to be increased further.

(3) To further expand a variable speed range to, for example, a range five times a base speed or higher and greatly increase a highest speed, the first permanent magnet 3 is magnetized in a direction opposite to the direction of the linkage flux of the second permanent magnet 4 (the flux B3 of the first permanent magnet 3 is oriented as shown in FIG. 5 and the magnet 3 is magnetized to the maximum). Then, the total linkage flux of the first and second permanent magnets 3 and 4 is the difference between the linkage flux of the second permanent magnet 4 and that of the first permanent magnet 3. Namely, the total linkage flux is minimized. At this time, the voltage of the rotating electrical machine is also minimized, to maximize the rotation speed (frequency) thereof.

In this way, the permanent-magnet-type rotating electrical machine according to the embodiment can realize a variable-speed operation in a wide range at high output from low rotation speed to very high rotation speed. In addition, the permanent-magnet-type rotating machine of the embodiment passes a magnetizing current for changing linkage flux only for a very short time. This results in remarkably reducing a loss and realizing high efficiency in a wide operating range.

Next, the influence of a torque current in the permanent-magnet-type rotating electrical machine of the embodiment will be explained. When the rotating electrical machine generates an output, the armature coil 21 of the stator 20 passes a q-axis current, so that the q-axis current and the fluxes B3 and B4 of the first and second permanent magnets 3 and 4 cause a magnetic action to generate torque. At this time, the q-axis current generates a magnetic field. The first permanent magnet 3, however, is arranged along the q-axis and has a magnetizing direction orthogonal to the q-axis. Namely, the magnetizing direction of the first permanent magnet 3 and the magnetic field by the q-axis current are orthogonal to each other. As a result, the influence of the magnetic field by the q-axis current is minor.

In the permanent-magnet-type rotating electrical machine of the embodiment, an action of the hollow 5 formed at each end of each of the first and second permanent magnets 3 and 4 will be explained. When the permanent magnets 3 and 4 apply a centrifugal force to the rotor core 2, the hollow 5 relaxes stress concentration to the rotor core 2 and a demagnetizing field. With the hollows 5 arranged as shown in FIG. 1, the rotor core 2 may have a curved shape to relax stress. A magnetic field created by a current tends to concentrate at each corner of the permanent magnets 3 and 4, and therefore, a demagnetizing field tends to irreversibly demagnetize the corner. The embodiment forms the hollow 5 at each end of the permanent magnets 3 and 4, to relax a demagnetizing field at each corner of the permanent magnets 3 and 4.

Next, the structural strength of the rotor 1 in the permanent-magnet-type rotating electrical machine of the embodiment will be explained. The first and second permanent magnets 3 and 4 are embedded in and fixed by the rotor core 2.

With the above-mentioned configuration, the permanent-magnet-type rotating electrical machine of the embodiment provides effects mentioned below. The linkage flux B4 of the second permanent magnet 4 made of the NdFeB magnet is oriented in the normal direction and the linkage flux B3 of the first permanent magnet 3 made of the alnico magnet is adjustable in a wide range from a maximum value in the normal direction to zero to a maximum value in the opposite direction. The embodiment magnetizes the first permanent magnet 3 with a d-axis current, to widely adjust the total linkage flux amount of the first and second permanent magnets 3 and 4. Widely adjusting the total linkage flux amount of the first and second permanent magnets 3 and 4 results in widely adjusting the voltage of the rotating electrical machine. The magnetization is carried out by passing a pulse current for a very short time, and therefore, there is no need of always passing a flux-weakening current, to thereby greatly reduce a loss.

Unlike the related art, the embodiment has no need of carrying out the flux-weakening control, and therefore, causes no harmonic iron loss due to harmonic flux.

In this way, the permanent-magnet-type rotating electrical machine of the embodiment realizes a variable-speed operation at high output in a wide range from low speed to high speed and achieves high efficiency in the wide operating range. In connection with a voltage induced by the permanent magnets, the first permanent magnet 3 is magnetized with a d-axis current to reduce the total linkage flux amount of the first and second permanent magnets 3 and 4. This prevents the breakage of inverter electronic parts due to the induced voltage of the first and second permanent magnets 3 and 4, thereby improving the reliability of the machine. When the rotating electrical machine turns under no load, the first permanent magnet 3 is magnetized with a negative d-axis current to reduce the total linkage flux amount of the permanent magnets 3 and 4. This remarkably reduces the induced voltage, to substantially eliminate the need of always passing a flux-weakening current to decrease the induced voltage, thereby improving total efficiency. The permanent-magnet-type rotating electrical machine of the embodiment may be installed in a commuter train that involves a long coasting interval, to greatly improve the total running efficiency of the train.

The embodiment shapes the first permanent magnet 3 so that it has a trapezoidal section. Namely, the magnetizing direction thickness of the first permanent magnet 3 is not constant. This provides the following effect. The alnico magnet of the first permanent magnet 3 has a high remanent flux density and a low coercive force, and in an area where the flux density thereof is low, the flux density sharply changes with respect to a magnetic field. Accordingly, to finely adjust the flux density thereof only with the strength of a magnetic field, the strength of the magnetic field must be precisely controlled. To cope with this, the embodiment utilizes the fact that a magnetizing force necessary for magnetizing a permanent magnet greatly changes depending on a magnetizing direction thickness of the permanent magnet and provides the first permanent magnet 3 with the trapezoidal section so that the magnetizing direction thickness of the first permanent magnet 3 is inconstant. When a magnetizing field is applied, the magnet 3 generates different flux amounts at respective thicknesses. Namely, the strength of a magnetizing field is greatly dependent on the thicknesses of the permanent magnet. Due to this, the embodiment can easily adjust a flux amount with respect to a magnetic field created by a d-axis current, thereby minimizing variations in flux amount due to variations in external conditions.

The permanent-magnet-type rotating electrical machine of the present invention can change a linkage flux amount by irreversibly magnetizing the first permanent magnet 3 with a magnetic field created by a d-axis current. By always generating flux with a negative d-axis current, linkage flux made of the flux based on the negative d-axis current and the fluxes B3 and B4 of the permanent magnets 3 and 4 can be adjusted with the negative d-axis current. Namely, by irreversibly changing a magnetized state of the first permanent magnet 3, the linkage flux amount can greatly be changed. In addition, the linkage flux amount can finely be adjusted with an always-passed negative d-axis current. The linkage flux amount finely adjusted by the always-passed negative d-axis current is small, and therefore, the always-passed negative d-axis current is small not to cause a large loss. As a result, the permanent-magnet-type rotating electrical machine of the embodiment can widely change a linkage flux amount that is a base of a voltage, finely adjust the same, and vary the same at high efficiency.

Second Embodiment

A permanent-magnet-type rotating electrical machine according to the second embodiment of the present invention is characterized in that it adopts an NdFeB magnet having little Dy element in place of the second permanent magnet 4 whose product of a coercive force and a magnetizing direction thickness is large of the permanent-magnet-type rotating electrical machine of the first embodiment shown in FIG. 1. The remaining configuration of the second embodiment is common to the first embodiment shown in FIG. 1.

With little Dy element, the remanent flux density of the permanent magnet becomes high to 1.33 T or over at 20° C.

At high speed, the rotating electrical machine of the related art carries out flux-weakening control with a negative d-axis current to suppress a voltage increase due to an induced voltage. At this time, an excessive counter magnetic field acts on a permanent magnet so that the permanent magnet is irreversibly demagnetized to greatly reduce output. To cope with this, the related art employs an NdFeB magnet having a large coercive force. To increase the coercive force of the NdFeB magnet, Dy element is added. This, however, lowers the remanent flux density of the permanent magnet to decrease the output of the rotating electrical machine. Also, only to improve an ability to resist against demagnetization, the magnetizing direction thickness of the NdFeB magnet must be increased.

The permanent-magnet-type rotating electrical machine of the embodiment irreversibly magnetizes an alnico magnet serving as the first permanent magnet 3, to adjust a linkage flux amount that generates a voltage. Accordingly, the embodiment conducts no flux-weakening control that applies an excessive magnetic field on the second permanent magnet 4 that is an NdFeB magnet. Although the embodiment may use the weakening control for a fine adjustment, a current used for this is very small to minimize a counter magnetic field. As a result, the NdFeB magnet employed by the permanent-magnet-type rotating electrical machine of the embodiment may be of a low coercive force and a high remanent flux density, this sort of NdFeB magnet being not adoptable by the rotating electrical machine of the related art due to demagnetization. Such an NdFeB magnet can increase an air gap flux density and provide high output.

For example, the NdFe magnet adopted by the rotating electrical machine of the related art has a coercive force Hcj of 2228 kA/m and a remanent flux density Br of 1.23 T. On the other hand, the NdFeB magnet employed by the embodiment has Hcj=875 kA/m and a remanent flux density Br of 1.45 T. In this way, the coercive force of the embodiment is small but the flux density thereof is 1.17 times larger than that of the related art. Namely, the embodiment is expected to provide output about 1.17 times larger than that of the related art.

The rotating electrical machine of the related art increases, without contributing to the output thereof, a magnet thickness only for resisting against demagnetization. On the other hand, the permanent-magnet-type rotating electrical machine of the embodiment involves a small demagnetizing field, and therefore, can reduce the quantity of use of the NdFeB magnet. The embodiment can employ an NdFeB magnet containing substantially no Dy element that is a rare material, and therefore, can stably be manufactured in the future.

Third Embodiment

Figure 6:
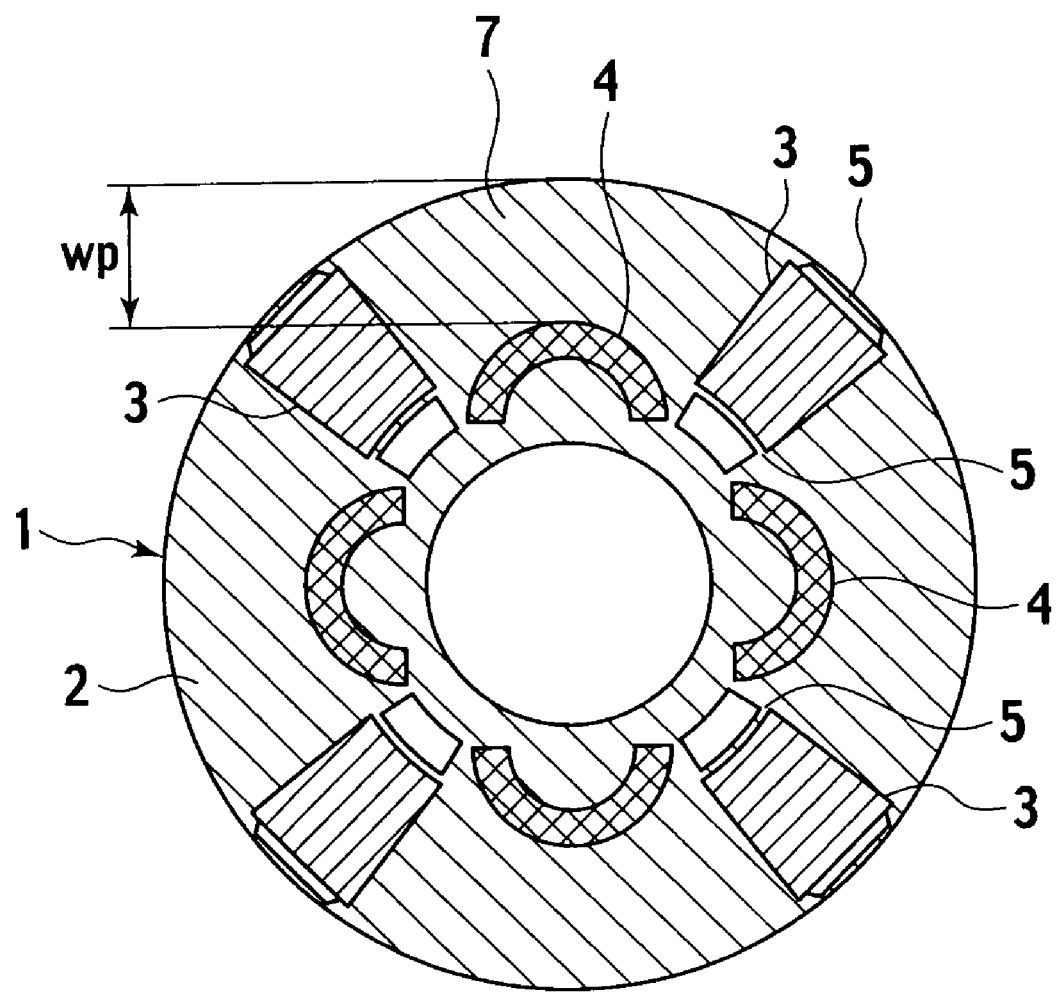
FIG. 6 is a sectional view showing a rotor of a permanent-magnet-type rotating electrical machine according to a second embodiment of the present invention.

A permanent-magnet-type rotating electrical machine according to the third embodiment of the present invention will be explained with reference to a structural view of a rotor 1 shown in FIG. 6. The permanent-magnet-type rotating electrical machine of this embodiment consists of the rotor 1 shown in FIG. 6 and a stator 20 accommodating the rotor 1. Like the other embodiments, the stator 20 has the configuration shown in FIGS. 1 and 9. In FIG. 6, elements common to those of the first embodiment shown in FIG. 1 are represented with the same reference marks.

As shown in FIG. 6, the rotor 1 of this embodiment embeds second permanent magnets 4 in a rotor core 2, each second permanent magnet 4 being an NdFeB magnet having an inverted U-shape that protrudes toward an outer circumferential side. A center axis of the inverted U-shape of the second permanent magnet 4 is on a d-axis. Each first permanent magnet 3 is made of an alnico magnet and is arranged inside the rotor core 2 along a q-axis in a diametrical direction of the rotor 1.

The inverted U-shape of the second permanent magnet 4 expands the area of a magnetic pole of the second permanent magnet 4 in an area between two first permanent magnets 3. In addition, the inverted U-shape of the second permanent magnet 4 that is arranged to prevent a magnetic path of q-axis flux can reduce a q-axis inductance and improve the power factor of the rotating electrical machine. A distance Wp between an outer end (central part) of the inverted U-shaped second permanent magnet 4 and an outer circumference (air gap face) of the rotor core 2 is so set to be magnetically saturated with flux of the first and second permanent magnets 3 and 4. By setting a flux density at a central part of a pole core portion 7 at about 1.9 T, a flux distribution of the air gap will not be distorted, and therefore, the flux of each permanent magnet can effectively be used.

Like the second embodiment, the third embodiment can adopt an NdFeB magnet containing little Dy element as the second permanent magnet 4 whose product of a coercive force and a magnetizing direction thickness is large, to further increase output and reduce the weight of the rotating electrical machine.

Fourth Embodiment

Figure 7:
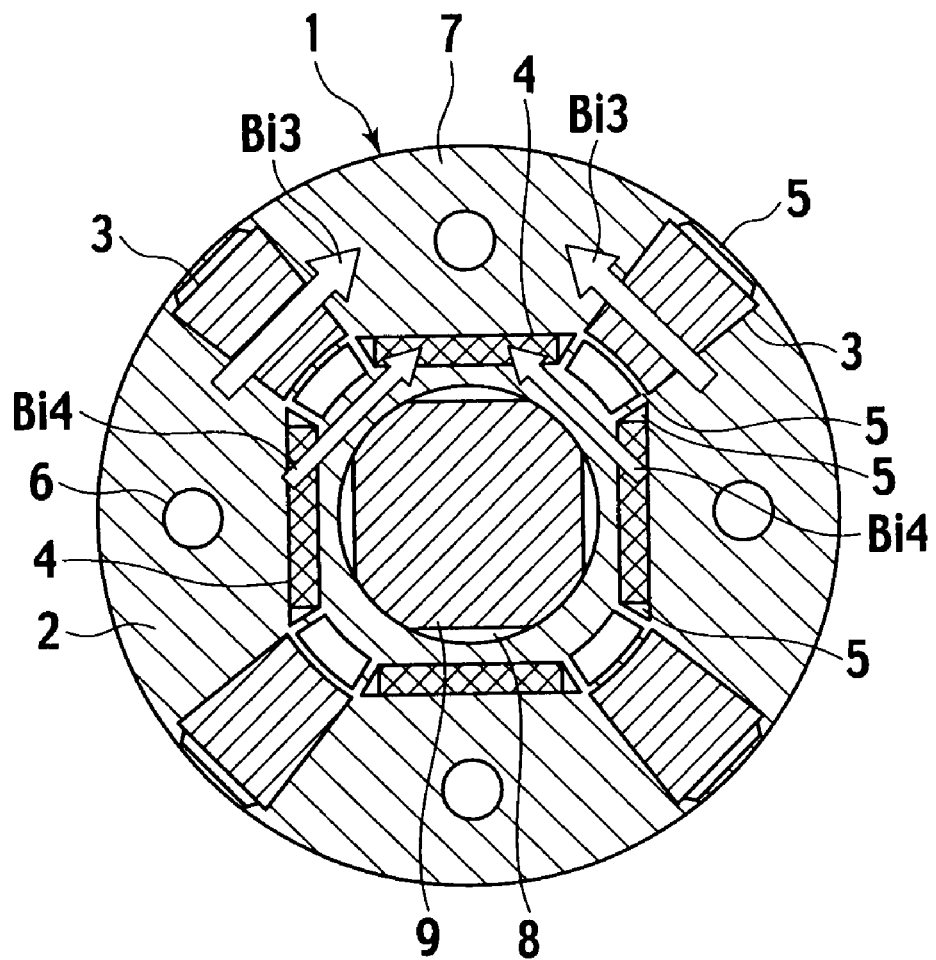
FIG. 7 is a sectional view showing a rotor of a permanent-magnet-type rotating electrical machine according to a third embodiment of the present invention.

A permanent-magnet-type rotating electrical machine according to the fourth embodiment of the present invention will be explained with reference to a structural view of a rotor 1 shown in FIG. 7. The permanent-magnet-type rotating electrical machine of this embodiment consists of the rotor 1 shown in FIG. 7 and a stator 20 accommodating the rotor 1. Like the other embodiments, the stator 20 has the configuration shown in FIGS. 1 and 9. In FIG. 7, elements common to those of the first embodiment shown in FIG. 1 are represented with the same reference marks.

As shown in FIG. 7, the rotor 1 of this embodiment arranges each first permanent magnet 3 made of an alnico magnet inside a rotor core 2 along a q-axis in a diametrical direction. Each second permanent magnet 4 is made of an NdFeB magnet and is arranged inside the rotor core 2 in a circumferential direction orthogonal to a d-axis. An inner circumferential side of the rotor core 2 of the rotor 1 is engaged with an iron shaft 9. The shaft 9 has four cut faces to form an air layer 8 between the rotor core 2 and the shaft 9.

An armature coil 21 of the stator 20 passes a current to generate a magnetic field for magnetizing the permanent magnets. Namely, the magnetic field acts on the first and second permanent magnets 3 and 4, to form fluxes Bi3 and Bi4 indicated with arrows in FIG. 7. The fluxes Bi3 and Bi4 created by the current do not pass through the shaft 9 because of the air layer 8 but pass through a narrow iron core part on the inner circumferential side between the second permanent magnets 4. This narrow iron core part, however, easily magnetically saturates, to reduce the flux Bi4 that is generated by the magnetic field created by the armature current and passes through the second permanent magnets 4.

As a result, the flux Bi3 of the first permanent magnets 3 that must be magnetized increases, and at the same time, the flux Bi4 of the second permanent magnets 4 decreases to relax the magnetic saturation of the pole core portion 7 and stator iron core 22. This results in reducing a d-axis current necessary for magnetizing the first permanent magnets 3.

Like the second embodiment, the fourth embodiment can adopt an NdFeB magnet containing little Dy element as the second permanent magnet 4 whose product of a coercive force and a magnetizing direction thickness is large, to further increase output and reduce the weight of the rotating electrical machine.

Fifth Embodiment

Figure 8:
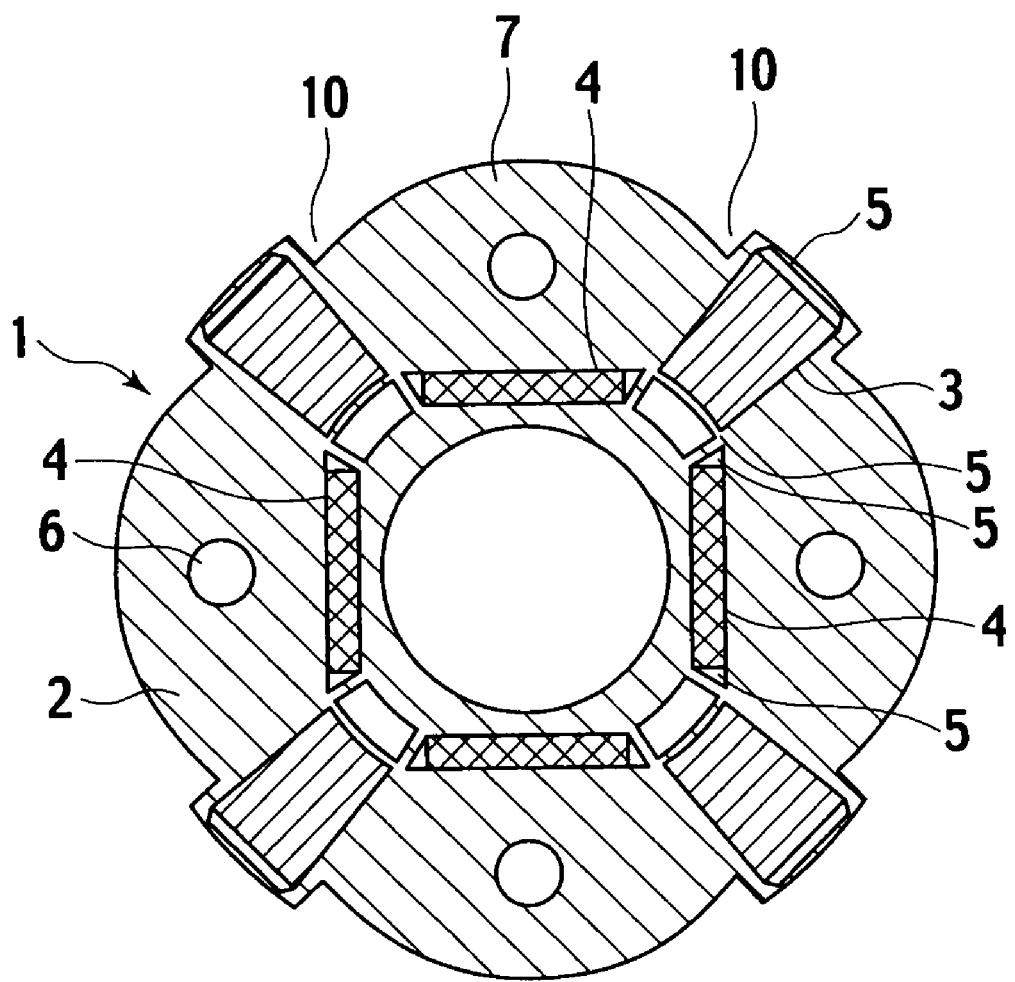
FIG. 8 is a sectional view showing a rotor of a permanent-magnet-type rotating electrical machine according to a fourth embodiment of the present invention.

A permanent-magnet-type rotating electrical machine according to the fifth embodiment of the present invention will be explained with reference to FIG. 8. The permanent-magnet-type rotating electrical machine of this embodiment consists of a rotor 1 shown in FIG. 8 and a stator 20 accommodating the rotor 1. Like the other embodiments, the stator 20 has the configuration shown in FIGS. 1 and 9. In FIG. 8, elements common to those of the first embodiment shown in FIG. 1 are represented with the same reference marks.

As shown in FIG. 8, the rotor 1 of this embodiment arranges first permanent magnets 3 of alnico magnets inside a rotor core 2 in a radial direction of the rotor 1 that agrees with a q-axis serving as an inter-pole center axis. Except for a part of the rotor core 2 at each end of the first permanent magnet 3, an outermost circumference of the rotor core 2 around the q-axis on the air gap side is recessed, to form recesses 10.

Action of the permanent-magnet-type rotating electrical machine of the embodiment having the above-mentioned configuration will be explained. Flux (d-axis flux) created by a d-axis current crosses the first and second magnets 3 and 4. The magnetic permeability of the permanent magnets 3 and 4 is substantially equal to that of air, and therefore, a d-axis inductance is small. On the other hand, flux in a q-axis direction passes through a pole core portion 7 of the rotor core 2 along the first and second permanent magnets 3 and 4. The magnetic permeability of the pole core portion 7 of the rotor core 2 is 1000 to 10000 times as large as that of the permanent magnets. If the q-axis part of the rotor core 2 has no recess 10 and if the outer diameter of the rotor core 2 is circumferentially uniform, a q-axis inductance will be large. The q-axis must pass a current to produce magnetic action and flux to generate torque. At this time, the large q-axis inductance increases a voltage generated by the q-axis current. Namely, the large q-axis inductance deteriorates a power factor.

To cope with this, the embodiment recesses the outermost circumference of the rotor core 2 around the q-axis on the air gap side, to form the recesses 10 that decrease flux passing through the recesses 10. Since the recesses 10 are present in the q-axis direction, they can reduce the q-axis inductance. This results in improving the power factor of the rotating electrical machine. Each recess 10 equivalently elongates an air gap length around each end of the first permanent magnet 3, to lower an average magnetic field around the end of the first permanent magnet 3. This results in reducing the influence of a demagnetizing field on the first permanent magnet 3 due to the q-axis current for generating torque.

Between the end of the first permanent magnet 3 and the middle of the pole core portion 7 of the rotor core 2, the middle of the pole core portion 7 on the d-axis defines an outermost peripheral part. The distance between the axial center of the rotor 1 and the outer circumference of the rotor core 2 decreases from the middle of the pole core portion 7 toward the end of the first permanent magnet 3 on the outer circumferential side of the rotor core 2. This shape can reduce the q-axis inductance like the case mentioned above, to suppress the demagnetization of the first permanent magnet 3 due to the q-axis current. The recesses 10 smoothly incline along the outer circumference of the rotor 1, to reduce harmonic flux, torque ripple, and cogging torque.

Like the second embodiment, the fifth embodiment can adopt an NdFeB magnet containing little Dy element as the second permanent magnet 4 whose product of a coercive force and a magnetizing direction thickness is large, to further increase output and reduce the weight of the rotating electrical machine.

(Modification 1) In each of the first to fifth embodiments, the rotor 1 is inserted into the stator 20 during an assembling process. At this time, the first permanent magnet 3 may be magnetized so that flux by the first permanent magnet 3 and flux by the second permanent magnet 4 are oppositely oriented at the pole core portion 7 or the air gap face.

When assembling the magnetized rotor 1 and the stator 20 together in a manufacturing process, some measure must be taken against the magnetic attraction of the permanent magnets. Magnetizing the magnets so that flux of the first permanent magnet 3 and flux of the second permanent magnet 4 are oppositely oriented helps reduce the total flux amount of the permanent magnets in the rotor 1. This results in reducing the magnetic attraction between the rotor 1 and the stator 20, to improve the workability of the assembling work. If the flux amount generated by the first and second permanent magnets 3 and 4 is zeroed, there will be no magnetic attraction, so that the rotor 1 can very easily be assembled with the stator 20.

(Modification 2) In each of the above-mentioned embodiments, the second permanent magnet 4 whose product of a coercive force and a magnetizing direction thickness is large is an NdFeB magnet and the first permanent magnet 3 whose product of a coercive force and a magnetizing direction thickness is small is an alnico magnet. At this time, the second permanent magnet 4 is configured so that a counter electromotive voltage generated by the second permanent magnet 4 at a maximum rotation speed is equal to or lower than a withstand voltage of electronic parts of an inverter serving as a power source of the rotating electrical machine.

A counter electromotive voltage generated by a permanent magnet increases in proportion to a rotation speed. The counter electromotive voltage is applied to electronic parts of an inverter, and if it exceeds a withstand voltage of the electronic parts, the electronic parts will break. To cope with this, the permanent-magnet-type rotating electrical machine according to the related art is designed so that a counter electromotive voltage to be generated by a permanent magnet will not exceed a withstand voltage of electronic parts. This design, however, cuts a flux amount of the permanent magnet, thereby lowering the output and efficiency of the machine in a low-speed zone.

To cope with this, the modification 2 irreversibly magnetizes, at high-speed rotation, the first permanent magnet 3 with a demagnetizing field created by a negative d-axis current, thereby nearly zeroing flux of the first permanent magnet 3. Since a counter electromotive voltage by the first permanent magnet 3 can nearly be zeroed, it is only needed to make a counter electromotive voltage generated at a maximum rotation speed by the second permanent magnet 4 whose flux amount is unadjustable lower than a withstand voltage of electronic parts. Namely, only the flux amount of the second permanent magnet 4 made of an NdFeB magnet must be reduced not to reach the withstand voltage. On the other hand, at low-speed rotation, a linkage flux amount of the first permanent magnet 3, which is magnetized to the maximum, and the second permanent magnet 4 can be increased.

In a maximum speed zone, the first permanent magnet 3 made of an alnico magnet is magnetized oppositely to a low-speed zone. Accordingly, the total linkage flux amount becomes lower than the linkage flux amount of the second permanent magnet 4 alone. Namely, according to the permanent-magnet-type rotating electrical machine of this modification, a counter electromotive voltage at high speed becomes lower than that of the second permanent magnet 4 alone, so that a withstand voltage and an allowable maximum rotation speed may actually have sufficient margins. As a result, the permanent-magnet-type rotating electrical machine of the modification 2 can maintain high output and high efficiency at low-speed rotation, suppress a counter electromotive voltage at high-speed rotation, and improve the reliability of a system including the inverter.

(Modification 3) Each of the above-mentioned embodiments has been explained in connection with a four-pole permanent-magnet-type rotating electrical machine. The present invention is naturally applicable to multipole rotating electrical machines such as eight-pole rotating electrical machines. Depending on the number of poles, the arrangement, positions, and shapes of permanent magnets must more or less be changed. However, they provide similar actions and effects.

According to the embodiments, permanent magnets that form magnetic poles are each defined according to the product of a coercive force and a magnetizing direction thickness. The same action and effect as those of the embodiments will be provided by forming the magnetic poles with permanent magnets of the same kind but of different magnetizing direction thicknesses.

Figure 9:
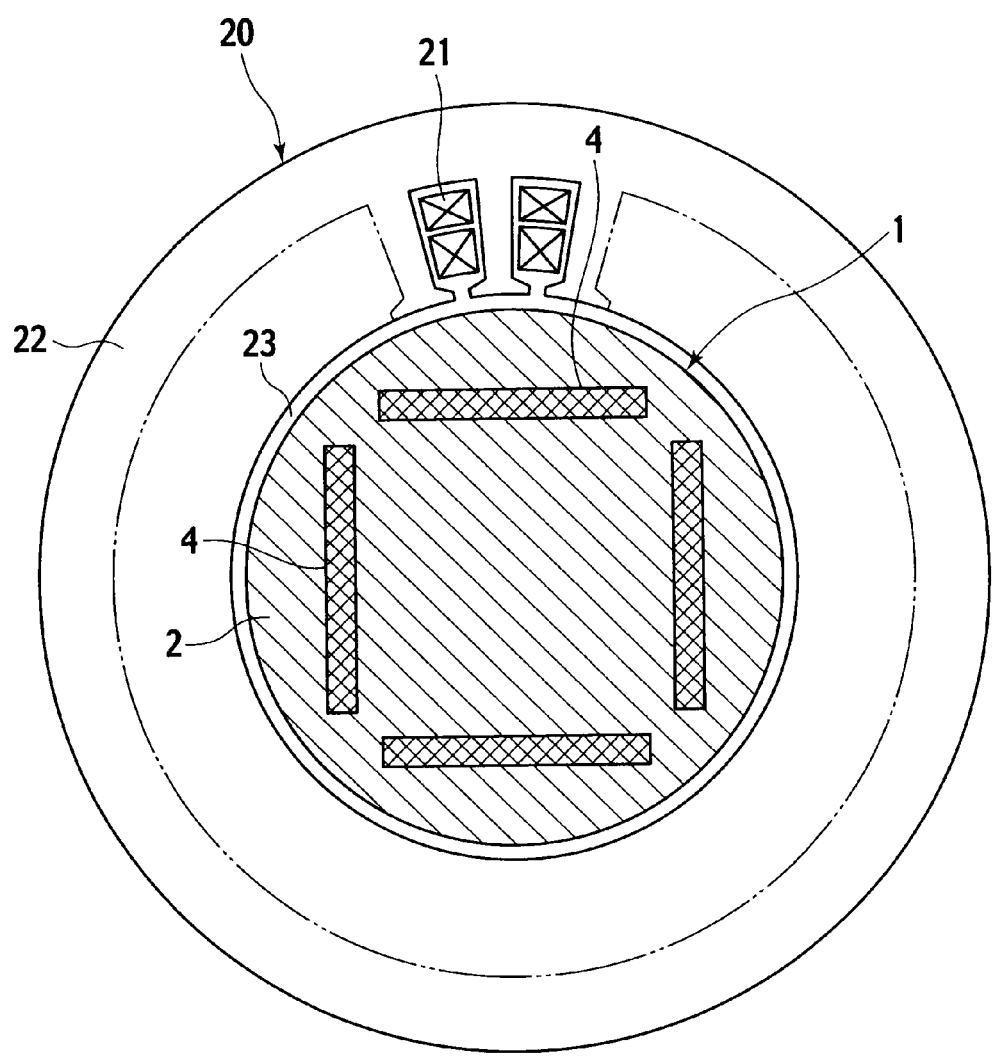
FIG. 9 is a sectional view showing an internal-permanent-magnet motor according to a related art.

According to the present invention, the structure of the stator 20 is not limited to the one shown in FIGS. 1 and 9. The present invention may employ stators of standard rotating electrical machines. Not only stators of a distributed coil type but also stators of a concentrated coil type are adoptable for the present invention.

The invention claimed is:

1. A rotor of a permanent-magnet-type rotating electrical machine, comprising:
    a plurality of first permanent magnets and second permanent magnets arranged in point symmetry with respect to a rotation center of the rotor and imbedded in a rotor core alternately along a rotational direction of the rotor,
    the first permanent magnets having a magnetic characteristic of being relatively more easily magnetized by a magnetic field created by a d-axis current flowing through an armature coil, the second permanent magnets having a magnetic characteristic of being relatively less easily magnetized than the first permanent magnets by the magnetic field and having a larger coercive force than a coercive force of the first permanent magnets,
    the plurality of first permanent magnets and second permanent magnets to form a plurality of magnetic poles around a rotational axis with each second permanent magnet and two first permanent magnets each neighboring the second permanent magnet, and
    at each magnetic pole, the first permanent magnets are magnetized by the magnetic field created by a d-axis pulse that is greater than a usual current flowing through the armature coil during a normal operation, to irreversibly change a magnetic force of the first permanent magnets and maintain the changed magnetic force while not to irreversibly change a magnetic force of the second permanent magnets.

2. The rotor of a permanent-magnet-type rotating electrical machine as set forth in claim 1, wherein the first permanent magnets are inversely magnetized as to a flux amount thereof nearly zeroes a linkage flux amount of the armature coil created by all permanent magnets that form the magnetic pole concerned.

3. The rotor of a permanent-magnet-type rotating electrical machine as set forth in claim 1 or 2, wherein the first permanent magnets are configured to be affected by a biasing magnetic field of the second permanent magnets.

4. The rotor of a permanent-magnet-type rotating electrical machine as set forth in claim 1 or 2, wherein the first permanent magnets have a magnetic characteristic that a product of a coercive force and a magnetizing direction thickness thereof is substantially equal to or larger than a product of a magnetic field strength at a no-load operating point and a magnetizing direction thickness of the second permanent magnets.

5. The rotor of a permanent-magnet-type rotating electrical machine as set forth in claim 1 or 2, wherein the first permanent magnets are arranged at each of positions where an angle between a magnetizing direction thereof and a q-axis is larger than an angle between a magnetizing direction of each second permanent magnet and the q-axis.

6. The rotor of a permanent-magnet-type rotating electrical machine as set forth in claim 1 or 2, wherein the second permanent magnets are embedded in the rotor core and is shaped so that a longitudinal central part thereof is closer to an air gap than an end part thereof.

7. The rotor of a permanent-magnet-type rotating electrical machine as set forth in claim 1 or 2, wherein each of the second permanent magnets is arranged so that a distance from a central part thereof to an air gap face of the rotor core is appropriate not to magnetically saturate the rotor core around the central part of the permanent magnet with flux of all permanent magnets that form the magnetic pole concerned.

8. The rotor of a permanent-magnet-type rotating electrical machine as set forth in claim 1 or 2, wherein a magnetic path connected through a magnetic circuit in series with the second permanent magnets includes a sectional area so that a part of the magnetic path is magnetically saturated with the flux of the second permanent magnets.

9. The rotor of a permanent-magnet-type rotating electrical machine as set forth in claim 1 or 2, wherein each of the second permanent magnets is a permanent magnet having a remanent flux density of 1.33 T or over at 20° C.

10. The rotor of a permanent-magnet-type rotating electrical machine as set forth in claim 1 or 2, wherein each of the second permanent magnets is an NdFeB-based permanent magnet containing no Dy element.

11. The rotor of a permanent-magnet-type rotating electrical machine as set forth in claim 1 or 2, wherein the rotor core is shaped so that magnetic resistance is relatively smaller in a direction of a d-axis serving as a magnetic pole center axis of the rotor and is relatively larger in a direction of a q-axis serving as an inter-pole center axis.

12. The rotor of a permanent-magnet-type rotating electrical machine as set forth in claim 1 or 2, wherein the first permanent magnets are arranged in a vicinity of a q-axis serving as an inter-pole center axis, a magnetic pole central part of the rotor core aligned with a d-axis serving as a magnetic pole center axis is set to be an outermost peripheral part of the rotor, and a part of the rotor core between the vicinity of the magnet pole central part on the d-axis and the vicinity of the q-axis is recessed from an outermost peripheral part of the rotor.

13. A rotor of a permanent-magnet-type rotating electrical machine, comprising:
   a plurality of first permanent magnets and second permanent magnets arranged in point symmetry with respect to a rotation center of the rotor and imbedded in a rotor core alternately along a rotational direction of the rotor,
   the first permanent magnets having a magnetic characteristic of being relatively more easily magnetized by a magnetic field created by a d-axis current flowing an armature coil, the second permanent magnets having a magnetic characteristic of being relatively less easily magnetized than the first permanent magnets by the magnetic field and having a larger coercive force than a coercive force of the first permanent magnets,
   the plurality of first permanent magnets and second permanent magnets form a plurality of magnetic poles around a rotational axis with each second permanent magnet and two first permanent magnets each neighboring to the second permanent magnet, and
   at each of the magnetic poles, the first permanent magnets are magnetized by the magnetic field created by a d-axis pulse current that is greater than a usual current flowing through the armature coil during a normal operation, to reverse a polarity of each first permanent magnet and maintain the reversed polarity while not to irreversibly change a magnetic force and a polarity of the second permanent magnets.

14. The rotor of a permanent-magnet-type rotating electrical machine as set forth in claim 13, wherein the first permanent magnets are arranged to be affected by a biasing magnetic field of the second permanent magnets.

15. The rotor of a permanent-magnet-type rotating electrical machine as set forth in claim 13, wherein the first permanent magnets have a magnetic characteristic that a product of a coercive force and a magnetizing direction thickness thereof is substantially equal to or larger than a product of a magnetic field strength at a no-load operating point and a magnetizing direction thickness of the second permanent magnets.

16. The rotor of a permanent-magnet-type rotating electrical machine as set forth in claim 13, wherein the first permanent magnets are arranged at each of positions where an angle between a magnetizing direction thereof and a q-axis is larger than an angle between a magnetizing direction of each second permanent magnet and the q-axis.

17. The rotor of a permanent-magnet-type rotating electrical machine as set forth in claim 13, wherein the second permanent magnets are embedded in the rotor core and are shaped so that a longitudinal central part thereof is closer to an air gap than an end part thereof.

18. The rotor of a permanent-magnet-type rotating electrical machine as set forth in claim 13, wherein each of the second permanent magnets is arranged so that a distance from a central part thereof to an air gap face of the rotor core is appropriate not to magnetically saturate the rotor core around the central part of this permanent magnet with flux of all permanent magnets that form the magnetic pole concerned.

19. The rotor of a permanent-magnet-type rotating electrical machine as set forth in claim 13, wherein a magnetic path connected through a magnetic circuit in series with each of the second permanent magnets includes a sectional area so that a part of the magnetic path is magnetically saturated with the flux of each of the first permanent magnet.

20. The rotor of a permanent-magnet-type rotating electrical machine as set forth in claim 13, wherein each of the second plural magnets is a permanent magnet having a remanent flux density of 1.33 T or over at 20° C.

21. The rotor of a permanent-magnet-type rotating electrical machine as set forth in claim 13, wherein each of the second permanents magnets is an NdFeB-based permanent magnet containing no Dy element.

22. The rotor of a permanent-magnet-type rotating electrical machine as set forth in claim 13, wherein the rotor core is shaped so that magnetic resistance is relatively smaller in the direction of a d-axis serving as a magnetic pole center axis of the rotor and is relatively larger in the direction of a q-axis serving as an inter-magnetic-pole center axis.

23. The rotor of a permanent-magnet-type rotating electrical machine as set forth in claim 13, wherein the first permanent magnets are arranged in a vicinity of a q-axis serving as an inter-pole center axis, a magnetic pole central part of the rotor core aligned with a d-axis serving as a magnetic pole center axis is set to be an outermost peripheral part of the rotor, and a part of the rotor core between the vicinity of the magnet pole central part on the d-axis and the vicinity of the q-axis is recessed from an outermost peripheral part of the rotor.

* * * * *